United States Patent [19]
Lee et al.

[11] Patent Number: 5,691,858
[45] Date of Patent: Nov. 25, 1997

[54] MAGNETIC RECORDING AND REPRODUCING APPARATUS HAVING A SINGLE MASTER GEAR AND SLIDE MEMBER

[75] Inventors: Jung-jae Lee, Seoul; Ju-hyeong Lee, Suwon; Myeong-su Choi, Suwon; Jung-yong Lee, Suwon, all of Rep. of Korea

[73] Assignee: Samsung Electronics Co., Ltd., Kyungki-do, Rep. of Korea

[21] Appl. No.: 512,128

[22] Filed: Aug. 7, 1995

Related U.S. Application Data

[63] Continuation of Ser. No. 87,332, Jul. 8, 1993, abandoned.

[30] Foreign Application Priority Data

Jul. 8, 1992 [KR] Rep. of Korea .............. 92-12164

[51] Int. Cl.$^6$ .................................................. G11B 5/027
[52] U.S. Cl. .................................................. 360/85; 360/95
[58] Field of Search .................................. 360/84, 85, 95, 360/96.1, 130.23, 130.22

[56] References Cited

U.S. PATENT DOCUMENTS

| | | | |
|---|---|---|---|
| 4,408,236 | 10/1983 | Murata et al. | 360/85 |
| 4,672,476 | 6/1987 | Saito et al. | 360/85 |
| 4,685,009 | 8/1987 | Min et al. | 360/95 |
| 4,785,362 | 11/1988 | Nozawa et al. | 360/85 |
| 4,792,871 | 12/1988 | Hütter | 360/85 |
| 4,796,116 | 1/1989 | Kwon et al. | 360/85 |
| 4,951,164 | 8/1990 | Yasaka et al. | 360/85 |
| 4,972,278 | 11/1990 | Hara et al. | 360/94 |
| 5,172,283 | 12/1992 | Fukuyama et al. | 360/85 |

FOREIGN PATENT DOCUMENTS

| | | | |
|---|---|---|---|
| 63-14364 | 1/1988 | Japan | 360/95 |

*Primary Examiner*—Stuart S. Levy
*Assistant Examiner*—William J. Klimowicz
*Attorney, Agent, or Firm*—Sughrue, Mion, Zinn, Macpeak & Seas

[57] ABSTRACT

A magnetic recording and/or reproducing apparatus includes a single main slide member for interlocking the respective portions of a deck, a master gear member for moving the main slide member and a motor for driving the master gear member. The master gear member is engaged with a rack formed on the main slide member. The deck and a loading device for loading a cassette onto the deck are sequentially driven by the motor. The rack allows for mechanically stable operation and rapid mode change.

24 Claims, 10 Drawing Sheets

FIG. II
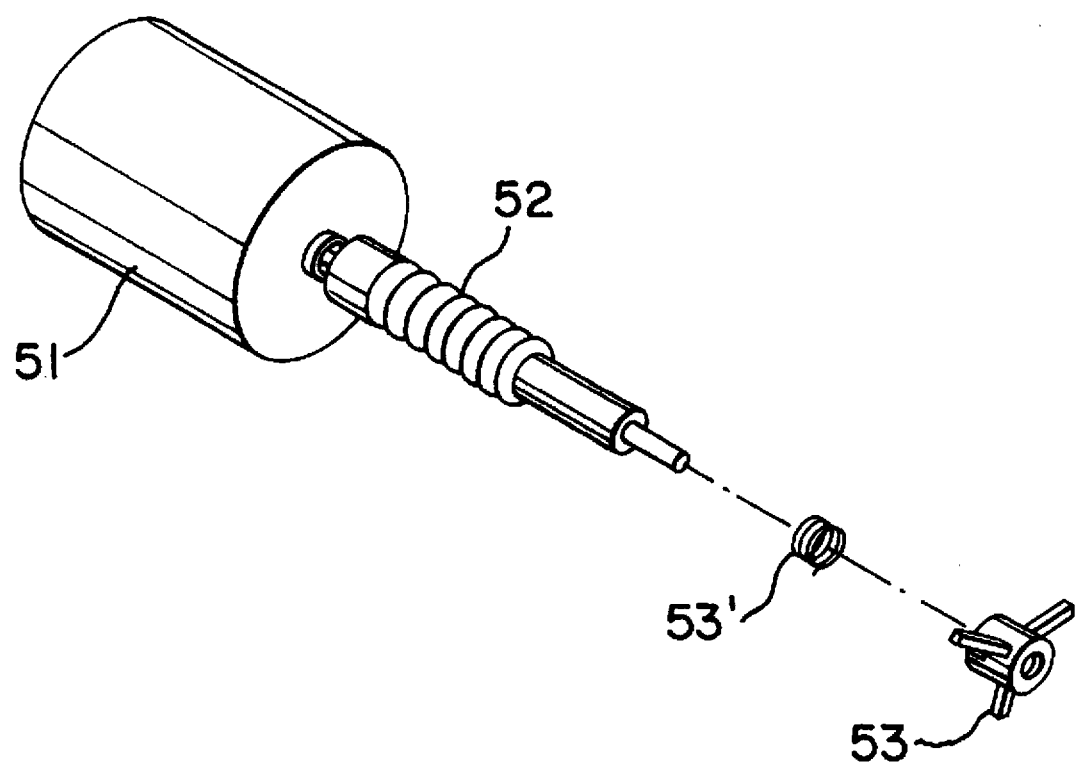

MAGNETIC RECORDING AND REPRODUCING APPARATUS HAVING A SINGLE MASTER GEAR AND SLIDE MEMBER

This is a Continuation of application Ser. No. 08/087,332 filed Jul. 8, 1993, now abandoned.

BACKGROUND OF THE INVENTION

1. Field of the Invention

The present invention relates to a magnetic recording and reproducing apparatus applicable to various tape driving mechanisms for performing predetermined functions such as recording/reproducing of information. Particularly the invention is a magnetic recording and reproducing apparatus which can vary the operating states of respective portions of the apparatus with a single master gear and slide member. The present disclosure is based upon the disclosure of Korean Patent Appln. No. 92-12164 filed Jul. 8, 1992.

2. Description of the Related Art

A tape driving mechanism utilizing a rotating head drum to perform a recording/reproducing operation on magnetic tape is conventionally employed in video cassette tape recorders, camcorders, digital audio tape recorders, and so forth. Generally, such a mechanism is coupled with a cassette loading device and has two reel driving tables on which two tape reels of a cassette loaded by the cassette loading device are seated and one of the two tape reels is selectively driven to wind the tape. A brake is supplied for selectively stopping the two reel driving tables. A tape loading device is provided for loading the tape on the head drum and a tension pole device serves to press the loaded tape to maintain tension thereof. A pinch-roller driving device presses the tape between a capstan and pinch roller, and at least one guiding device guides the travelling tape.

In such a mechanism, the operating state of each portion is controlled by a specific program control to preform such optional functions as still or slow-motion picture reproduction, high-speed search and reverse playback, as well as the basic functions of record, playback, high-speed fast forward and rewind operations. Such conventional devices have a complex structure and thus do not always operate reliably.

U.S. Pat. Nos. 4,408,236 and 4,672,476 disclose recording/reproducing devices in which a rotator formed with a cam groove is driven by a motor, to drive a slide member which has an interlocking pin inserted into the cam groove, to change the operating states of the respective portions of the mechanism according to the selected modes. Also, U.S. Pat. No. 4,685,009 discloses a recording/ reproducing device with a rotator having a cam groove and a clutch to drive the mechanism and cassette loading device using a single motor.

In these devices, since the rotator is rotated so that the cam groove causes the slide member to move, the mode changes are not rapidly carried out. Under mechanical overload conditions or in the case of a worn cam groove, the interlocking pin of the slide member can easily become disengaged from the cam groove to frequently cause malfunctions. Further, the short movement stroke of the slide member requires many additional components, thereby complicating the apparatus while increasing its cost and power consumption.

SUMMARY OF THE INVENTION

Therefore, it is an object of the present invention to provide a magnetic recording and/or reproducing apparatus having a greatly simplified structure and a mechanically stable operation, wherein the movement of respective portions of the mechanism is rapid.

To accomplish the object of the present invention, there is provided a magnetic recording and/or reproducing apparatus having a head drum, a capstan and a pinch roller which are rotated. A reel driving device selectively drives two tape reels on which tape is wound and a brake selectively stops the rotation of the two tape reels. A tape loading device is provided for loading tape between the two tape reels on the head drum and a tension maintaining device maintains tension by pressing the loaded tape. A pinch-roller driving device presses the tape between the capstan and pinch roller, and at least one guide device guides the tape.

The recording and reproducing apparatus also has a motor for producing power, a master gear member rotated by the motor, a main slide member having a rack which is engaged with the master gear member, and an interlocking device having a plurality of interlocking portions for interlocking the main slide member with the respective portions of a deck, respectively. The movements of the master gear member and main slide member are controlled according to mode selection and, according to their movements, the operating states of the respective portions of the deck are changed.

In the apparatus of the present invention, since the master gear member and main slide member are gear-connected to each other, the operating states of the mechanism can be quickly changed. The main slide member can be moved by a distance equal to the circumference of the gear portion of the master gear member, so that a relatively long stroke is secured for the main slide member and rotation of the master gear member can be limited to a single revolution. Therefore, only the main slide member is needed for interlocking the respective portions of the device. This obviates the need for many intermediate components. Further, since the rotation range of the master gear member is limited to one revolution, efficient control can be accomplished. In the present invention, since a cam groove is not formed in the master gear member, malfunctions due to worn parts and/or mechanical overload are minimized.

BRIEF DESCRIPTION OF THE DRAWINGS

The above object and other advantages of the present invention will become more apparent by describing in detail a preferred embodiment thereof with reference to the attached drawings in which:

FIG. 11 is an exploded perspective view of a motor and the auxiliary elements for generating power, which is adapted in the present invention.

DETAILED DESCRIPTION OF THE PREFERRED EMBODIMENT

First the structure of the preferred embodiment will be described. The operation thereof will be subsequently described in detail.

Figure 1:
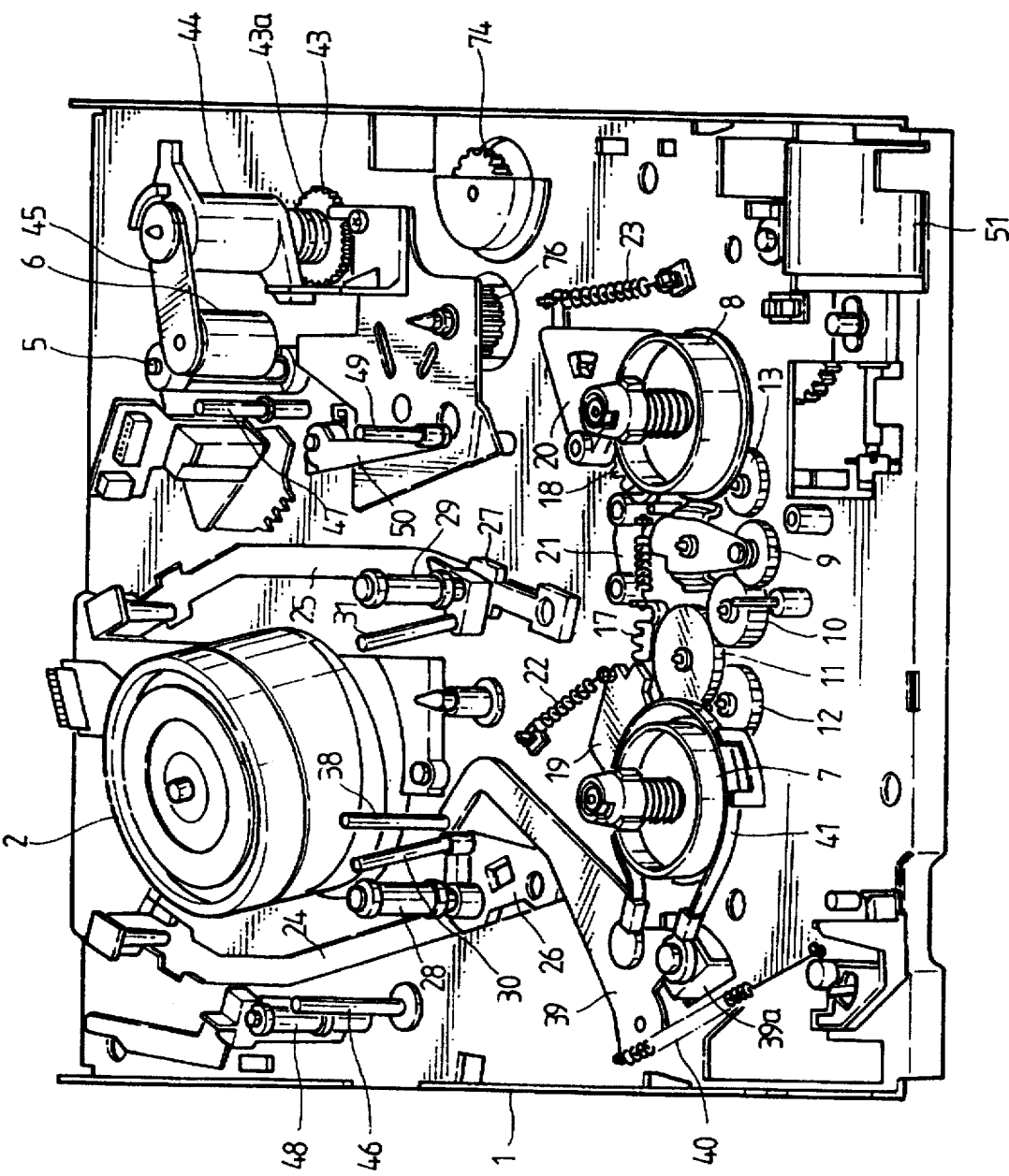
FIG. 1 is a top perspective view of a deck mechanism of a magnetic tape recording and/or reproducing apparatus according to a preferred embodiment of the present invention.
Figure 2:
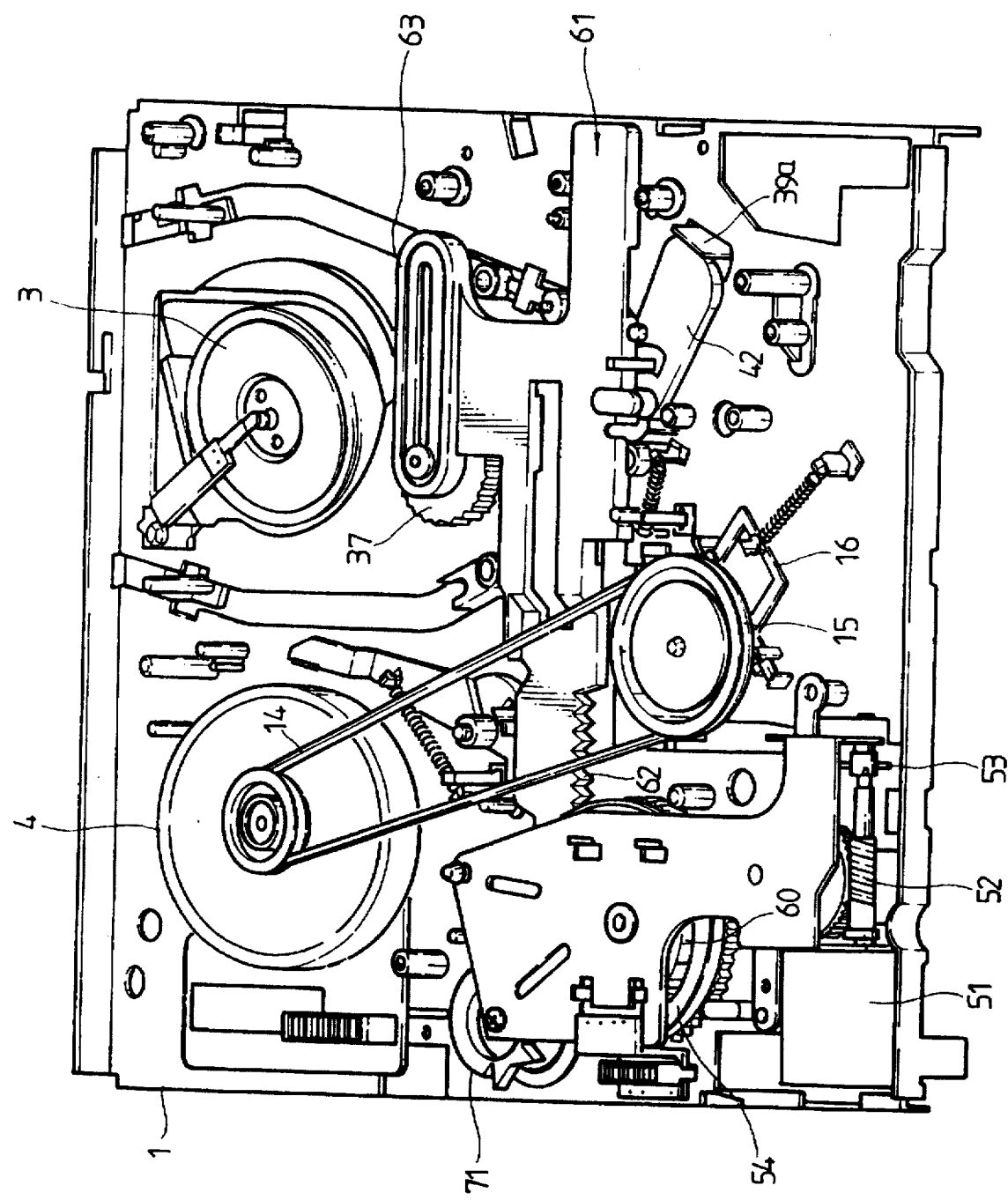
FIG. 2 is a bottom perspective view of a deck mechanism of a magnetic tape recording and/or reproducing apparatus according to the preferred embodiment.

FIGS. 1 and 2 respectively illustrate the exterior of the top and bottom of the deck mechanism of a VHS magnetic recording and reproducing apparatus according to the preferred embodiment of the present invention. Deck 1 has head drum 2 located in the upper left thereof. Head drum 2 is rotated by drum motor 3 shown in the view of the rear surface (see FIG. 2). Pinch roller 6 and capstan shaft 5, extending from capstan 4 are disposed in the upper right of deck 1 in the Figs.

A reel driving device for selectively driving two tape reels on which a length of tape (not shown) is wound, has reel driving tables 7 and 8 where the two tape reels are seated, idler 9, a plurality of relay gears 10, 11, 12 and 13, and clutch 15 (see FIG. 2) to which power is transferred from capstan 4 to belt 14. Clutch 15 is utilized to vary the driving torque of reel driving tables 7 and 8, and is operated by a shift lever 16.

A brake for selectively stopping the rotation of the two tape reels has two main brake levers 17 and 18 and two sub-brake levers 19 and 20. One of the main brake levers 17 and 18 is located proximate relay gear 11 of supply reel driving table 7, and the other thereof is located proximate take-up driving table 8. The two main brake levers are biased by spring 21, to be disengaged from the relay gear and take-up reel driving table 8, respectively. Sub-brake levers 19 and 20 are biased into soft contact with reel driving tables 7 and 8 respectively by springs 22 and 23 respectively.

Figure 4:
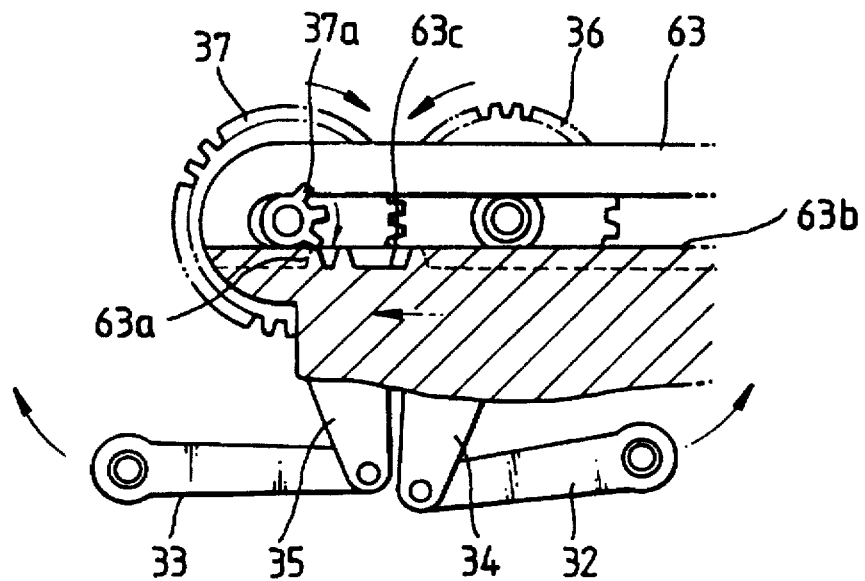
FIG. 4 is a plan view illustrating the operation of the tape loading gear assembly of the preferred embodiment.

A tape loading device for loading tape on the head drum 2 has pole bases 26 and 27 which are movable along guide openings 24 and 25 respectively on the front surface of deck 1, guide rollers 28 and 29, tilted poles 30 and 31 positioned on pole bases 26 and 27, and loading gears 36 and 37 for coupling pole bases 26 and 27 using links 32 and 33 and arms 34 and 35 on the rear surface of deck 1 (see FIG. 4).

As a tension maintaining device for maintaining tension of the loaded tape, spring 40 and tension band 41 are installed on tension arm 39, having tension pole 38, on the front surface of deck 1. To drive tension pole 38, interlocking portion 39a at the rear end of tension arm 39 is bent toward the rear surface of deck 1 to be in elastic contact with cam lever 42 (see FIG. 2).

As a pinch-roller driving device for pressing tape between the capstan shaft 5 and the pinch roller 6, gear 43 having threaded shaft 43a extending therefrom and a threaded holder 44, coupled to the threaded shaft to be vertically raised and lowered in response to rotation of the gear 43, are installed on the front surface of deck 1. Pinch roller 6 is connected to threaded holder 44 through pinch arm 45. Pinch roller 6 is driven to descend after tape loading and then press the tape against capstan shaft 5.

At least one guide device for guiding the tape, which is loaded on head drum 2 and travels between capstan shaft 5 and pinch roller 6, has two guide posts 46 and 47 at the front and rear respectively of head drum 2 and an impedance roller 48. Review pole 49 is movable toward pinch roller 6, is installed on review arm 50 and rotates during tape loading.

Figure 3:
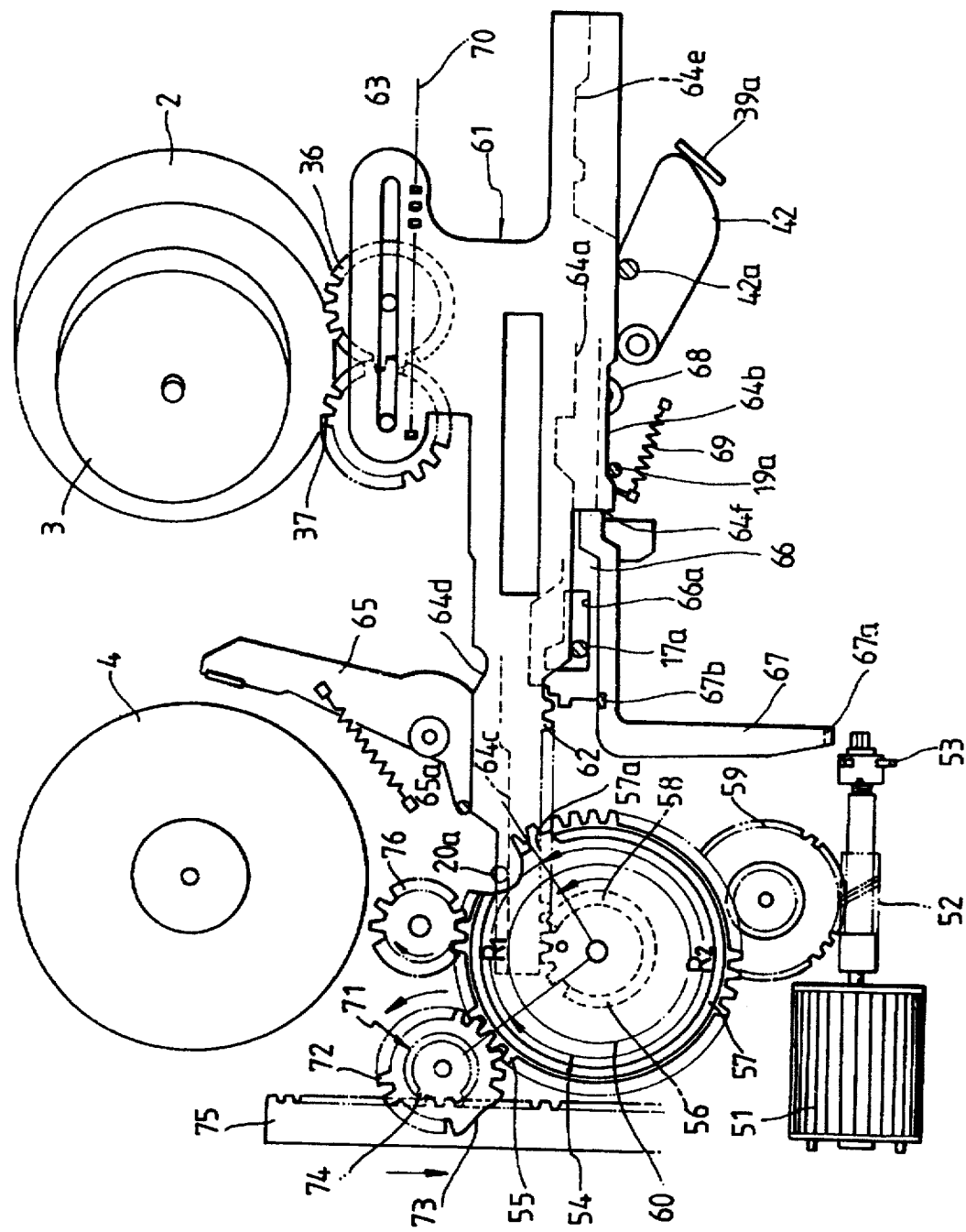
FIG. 3 is a bottom plan view of the important components of the deck mechanism of the preferred embodiment.

A motor 51 for producing power is installed in the lower right of the front surface of deck 1. Motor 51 rotates a worm gear 52 which is attached to the shaft of motor 51. As shown in FIGS. 3 and 11, a rotating pin 53 is connected with the end of worm gear 52 by a clutch spring 53' which is inserted between worm gear 52 and rotating pin 53. Clutch spring 53' is engaged with rotating pin 53 to grip the same when worm gear 52 rotates in one direction, so that the rotation of rotating pin 53 is allowed in one direction only.

Figure 12A:
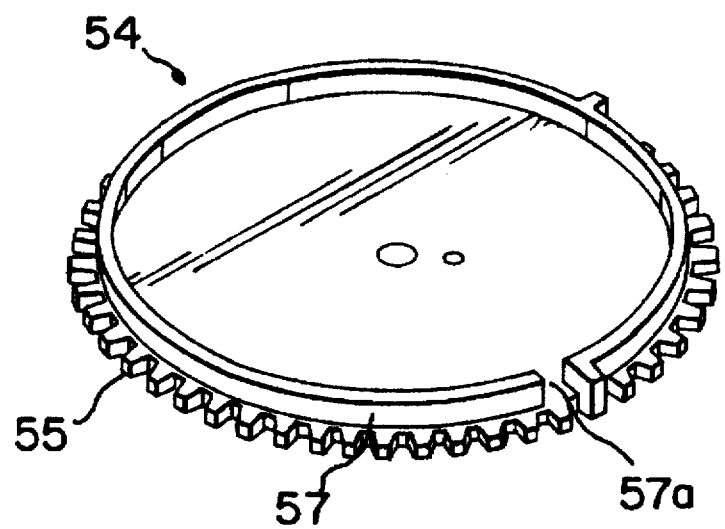
FIG. 12A is a top perspective view of the master gear member of the preferred embodiment.
Figure 12B:
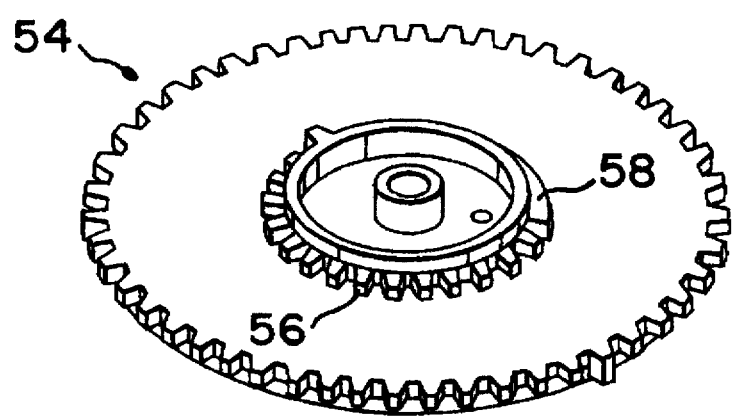
FIG. 12B is a bottom perspective view of the master gear member of the preferred embodiment.

Master gear 54 is installed on the rear surface of deck 1. Master gear 54 as shown in FIGS. 3, 12A and 12B, includes a larger-diameter gear portion 55, a smaller-diameter gear portion 56, a larger-circumference portion 57 whose surface lies in the addendum circle of larger-diameter gear portion 55. Opening 57a is formed in larger-circumference portion 57 by cutting a portion of larger-circumference portion 57. Also, a smaller-circumference portion 58 whose surface lies in the addendum circle of smaller-diameter gear portion 56 is provided. Master gear member 54 is rotated by a gear 59 which is connected between larger-diameter gear portion 55 and worm gear 52. Rotary program switch 60 (represented by a dashed, single-dotted line) is installed on the axis of master gear member 54, to output a switching signal for recognizing the operational states of various modes according to the rotation angle of master gear member 54.

Also shown in FIG. 3, main slide member 61, having rack 62 formed thereon and engaged with smaller-diameter gear portion 56 of master gear member 54, is rectilinearly movable, and has loading gear driving portion 63 for engagement with loading gears 36 and 37. Referring briefly to FIG. 4, three gear teeth 63a are formed in main slide member 61 for connectedly driving cam gear teeth 37a of load gear 37 and slide surface 63b is formed thereon for restraining the rotation of cam gear teeth 37a when slide surface 63b is placed in opposition to cam gear teeth 37a as shown in FIG. 4. Thus, loading gear driving 63 moves cam gear teeth 37a, and thus loading gear 37, during a portion of its motion and fixes the position of cam gear teeth 37a during other parts of its motion. This will be described in detail below. Further, main slide member 61 has multi-level slide cam portions 64a, 64b, 64c, 64d and 64e which are formed to interlock interlocking pin 17a of main brake lever 17, interlocking pins 19a and 20a of sub-brake levers 19 and 20, interlocking pin 42a of cam lever 42 and an interlocking pin 65a of capstan brake lever 65 provided to stop capstan 4, respectively.

Further, as illustrated in FIG. 3, brake locking lever 66 for abruptly stopping the tape after high-speed traveling, and locking release lever 67 are provided. Locking lever 66 has cam opening 66a formed therein for restraining the movement of interlocking pin 17a. Locking release lever 67 has pin contact end 67a, which is movable toward and away from rotation pin 53, and stopping boss 67b whose relative movement is limited by stopping step 64f of main slide member 61. Locking lever 66 and locking release lever 67 are coupled together by hinge 68 to be movable together and are elastically biased by spring 69. Interlocking pin 17a is connected to brake lever 17 shown in FIG. 1.

A scale 70 is marked on loading gear driving portion 63 of main slide member 61, so that the position of shaft 37b of loading gear 37 can be easily detected to indicate the moving stroke of main slide member 61. That is, when assembling or repairing the apparatus, a currently running mode is precisely recognized according to the relative position between main slide member 61 and shaft 37b.

Racing gear 71 is engaged with master gear member 54. Racing gear 71 has gear portion 72 which is selectively engaged with larger-diameter gear portion 55, cam 73 formed with the same circumference as that of the gear portion 72 which selectively slides on larger-circumference portion 57 of master gear member 54, and gear portion 74 engaged with slide rack 75 of a cassette loading mechanism (not shown). During a predetermined angular rotation R1 (see FIG. 3) of master gear member 54 corresponding to gear portion 72, racing gear 71 is rotated, by virtue of engagement between gear portion 72 and large diameter gear portion 55, to transmit the power to slide rack 74. During angular rotation R2, racing gear 71 is not rotated, because cam 73 slides on large circumference portion 57 of master gear member 54, and main slide member 61 continues to move toward racing gear 71. Therefore, with a single motor 51, the cassette loading mechanism can be driven during period R1 while various other portions of the deck continue to be driven at proper times.

Figure 13:
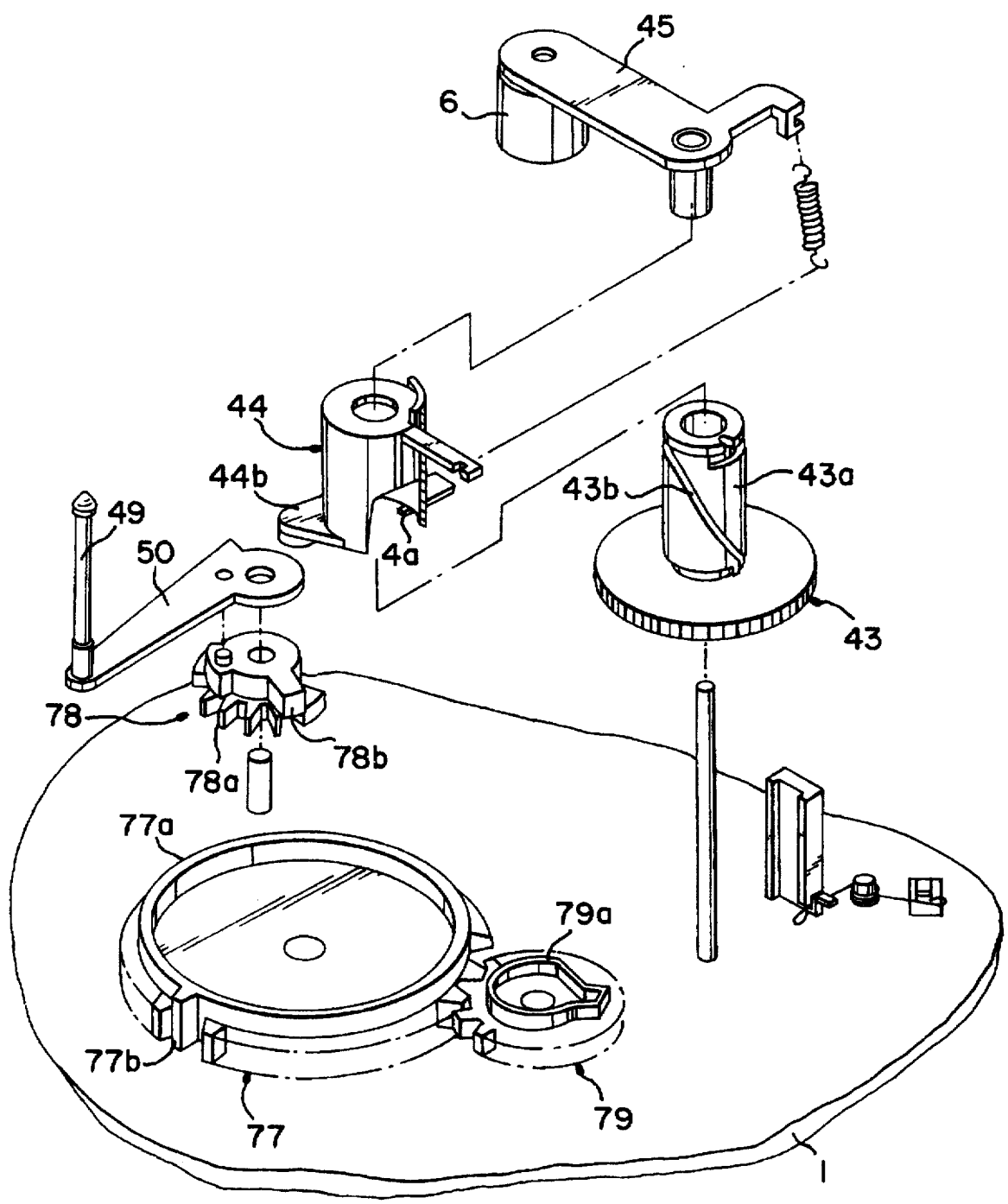
FIG. 13 is an exploded perspective view of the pinch roller driver, which is adapted in the present invention.

A gear 76 (see FIG. 1) transmits the power of master gear member 54 for driving pinch roller 6 and review pole 49. The gear 76 is engaged with review cam gear 77 shown in FIG. 13. The review cam gear 77 comprises a circumference cam 77a which corresponds to the addendum circle thereof and an extended tooth 77b formed on circumference cam 77a. Also, review cam gear 77 is connected to review arm gear 78 on which review arm 50 having review pole 49 is installed, and to pinch cam gear 79 having projecting cam 79a. Review arm gear 78 comprises gear portion 78a engagable with review cam gear 77, and cam projector 78b which is in slidable contact with circumference cam 77a, so that review cam gear 77 may race (spin freely) with respect to review arm gear 78 when cam projector 78b is in opposition to circumference cam 77a. In addition to threaded groove 43b is formed on threaded shaft 43a of gear 43, and threaded holder 44 has interlocking pin 44a which is inserted into threaded groove 43b and projection 44b which is in contact with projecting cam 79a of pinch cam gear 79. Pinch cam gear 79 and gear 43 can thus race in tandem when interlocking pin 44a is positioned either in the upper or lower portion of threaded groove 43b. Pinch roller 6 can be raised or lowered when interlocking pin 44a is positioned in threaded groove 43b and can be pressed by an interlocking function between projection 44b and projecting cam 79a when interlocking pin 44a is positioned in the lower portion of threaded groove 43b. After the pressing of pinch roller 6, gear portion 78a is disengaged from review cam gear 77 and extended tooth 77b of review cam gear 77 is released from cam projector 78b, thereby allowing review cam gear 77 to race.

Accordingly, in the preferred embodiment, the cassette loading mechanism (not shown) and deck 1 are sequentially driven using a single motor 51 and master gear member 54 and the various portions of deck 1 are interlocked using main slide member 61 to change modes.

Figure 10:
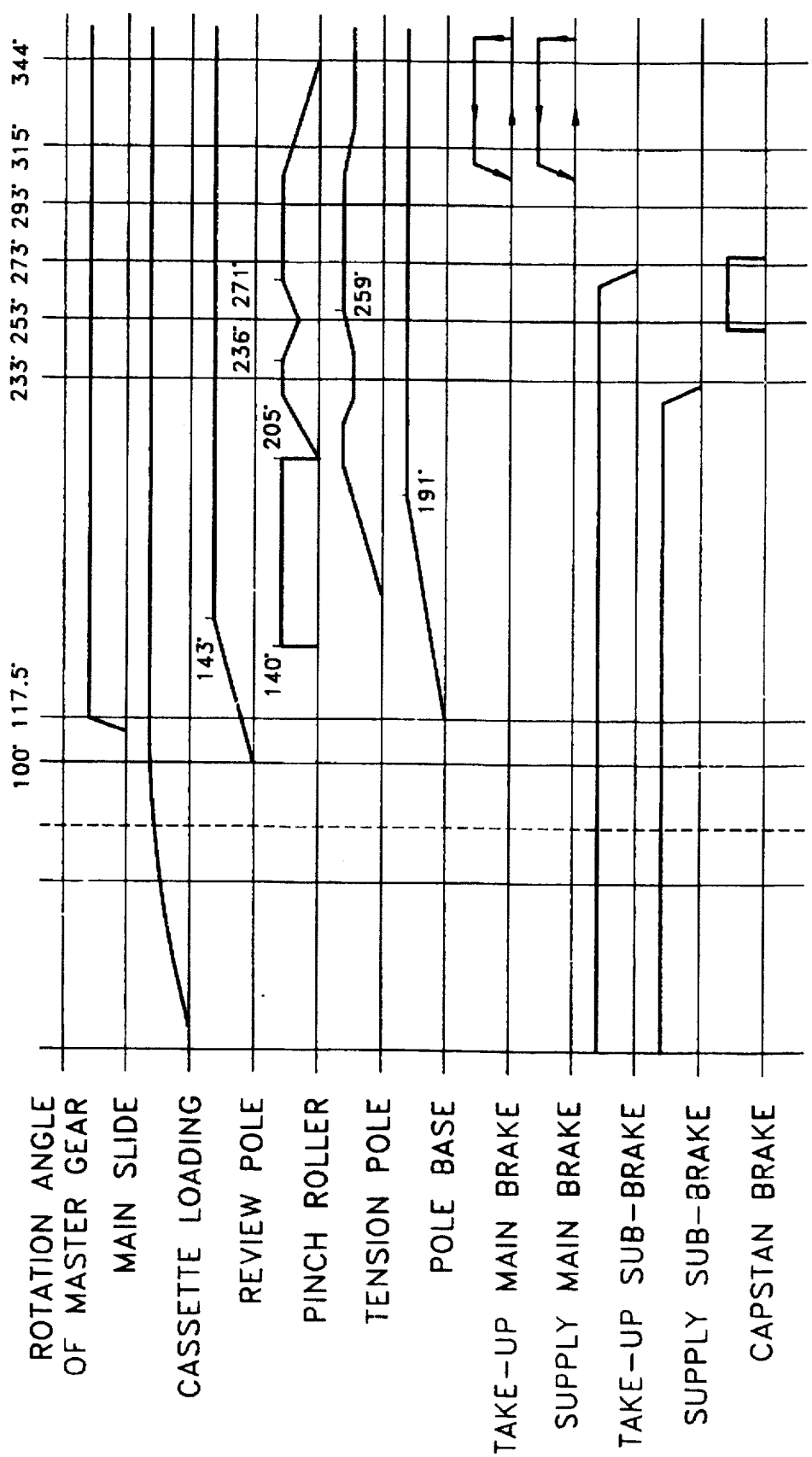
FIG. 10 is a timing chart illustrating the operation relations of respective portions of the preferred embodiment according to rotation angles of the master gear.

FIG. 10 illustrates operational mode states for respective portions of the apparatus according to the rotation angles of master gear member 54. These operational states will be described below.

FIG. 3 shows the cassette ejection mode, which is the initial state. In the initial state shown in FIG. 3, when a tape cassette is inserted into the cassette loading mechanism, motor 51 starts to operate. Master gear member 54 is rotated counter-clockwise by worm gear 52 and gear 59. Along with the rotation of master gear member 54, racing gear 71 and gear 76, which are connected to larger-diameter portion 55, are rotated. Racing gear 71 is rotated up to a 100° rotation angle of master gear member 54 to move slide rack 75 which is connected with gear portion 74. Due to the movement of slide rack 75, the cassette loading mechanism loads the cassette.

Figure 5:
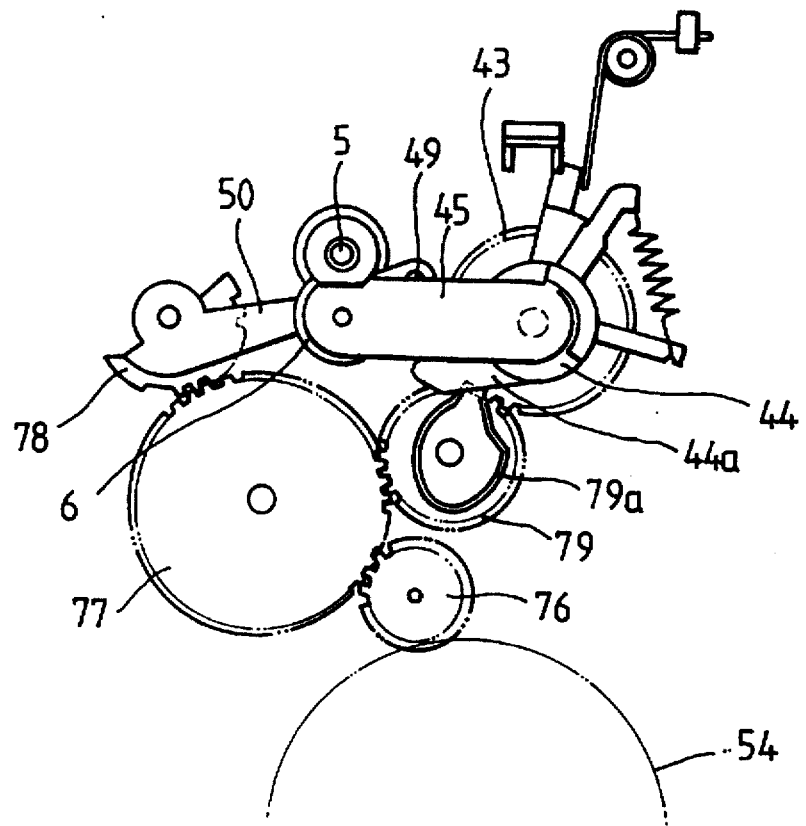
FIG. 5 is a plan view illustrating the operation of the pinch roller and review pole assembly according to the preferred embodiment.

Review arm 50 having review pole 49, as shown in FIG. 5, starts to rotate to a predetermined position through engagement with review cam gear 77 and review arm gear 78 from 100° to 143° of the rotation angle of master gear member 54. Meanwhile, pinch roller 6 is initially being lifted and is descended by threaded shaft 43a and threaded holder 44 from 140° to 205° of the rotation angle of master gear member 54. In the descended state, pinch roller 6 is pressed to capstan shaft 5 from 222° to 236° and beyond 271° by interaction between protruded cam 79a of pinch cam gear 79 and protruded arm 44a of threaded holder 44, and is slightly moved away from capstan shaft 5 at the 236° point.

Within a 0°–115° rotation of master gear member 54, main slide member 61 of FIG. 3 does not move since rack 62 slides on smaller-circumference portion 58 of master gear member 54. Beyond this range, main slide member 54 is engaged with smaller-diameter gear portion 56 which causes main slide member 54 to move. As main slide member 61 starts to move, the respective portions of deck 1 become interlocked with one another.

First, within 117.5°–191° of the rotation angle of master gear member 54, tape loading is performed. The operation of the tape loading is the same as that described above with respect to FIG. 4. More specifically, when main slide member 61 moves to the left, cam gear teeth 37a of loading gear 37 are rotated by being engaged with gear teeth 63a formed in loading gear interlocking portion 63. Then, as the two loading gears 36 and 37 are rotated together and pole bases 26 and 27 (FIG. 1) connected via links 32 and 33 and arms 34 and 35 are moved along guide openings 24 and 25 of deck 1, the tape loading is carried out. Here, a middle one-tooth gap 63c of gear teeth 63a contributes to the smooth driving and complete loading by accepting any mechanical error of the rotation of loading gears 36 and 37. After the tape loading is finished, cam gear teeth 37a reach a point where they are proximate slide surface 63b of loading gear interlocking portion 63 so that the reverse rotation of the teeth is restrained, by virtue of interaction between gear teeth 37a and slide surface 63b but the movement of main slide member 61 can continue to the left in the Figs. Almost in synchronization with the tape loading, as shown in FIG. 5, review pole 49 moves toward the outgoing side of pinch roller 6 by virtue of master gear member 54 and gear 76, and then pinch roller 6 descends and rotates to move toward capstan shaft 5 and press the tape. The subsequently continuous rotation of master gear member 54 is performed without difficulty due to the racing between cam gear 77 and review arm 78 and between gear 43 and threaded holder 44.

Figure 6:
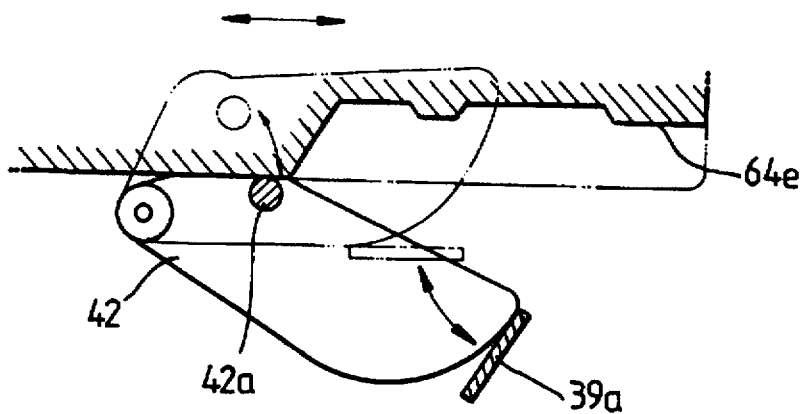
FIGS. 6 and 7 are plan views illustrating the operation of the tension pole assembly according to the preferred embodiment.
Figure 7:
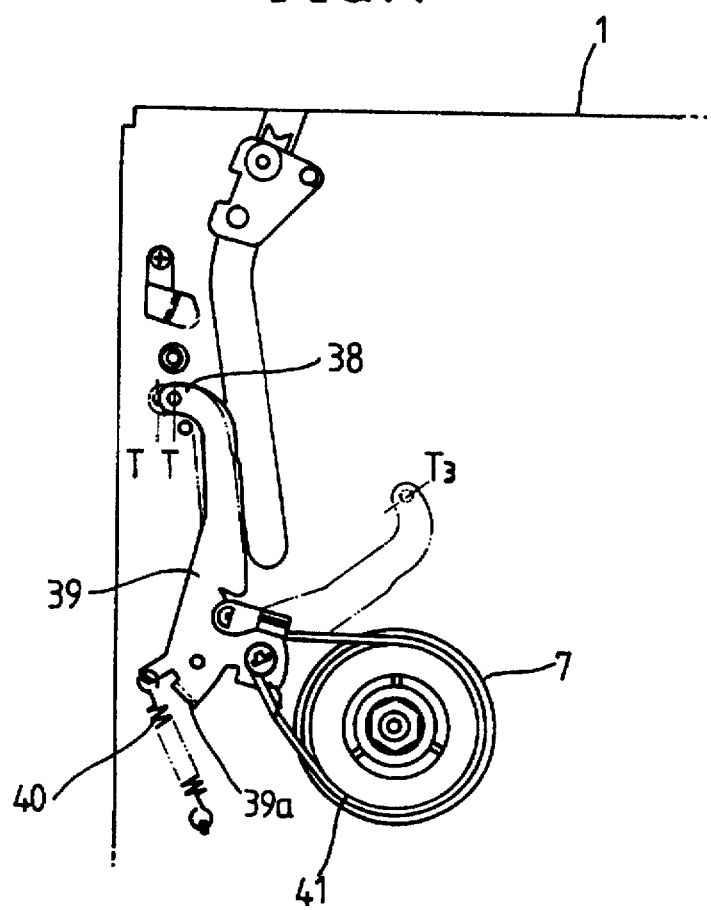

FIGS. 6 and 7 illustrate a tension maintaining device for pressing the loaded tape and maintaining tension thereof.

FIG. 6 shows the interlocking relation between main slide member 61 and cam lever 42. FIG. 7 shows the operation of tension pole 38 by cam lever 42. In FIG. 6, as main slide member 61 moves to the left or right, interlocking pin 42a is rotated by virtue of engagement with slide cam portion 64e of main slide member 61. By doing this, the location of interlocking portion 39a at the rear end of tension arm 39 is also shifted. According to the rotation position of tension arm 39 tension pole 38 moves to the T1, T2 or T3 location as shown in FIG. 7. In the T1 location, tension pole 38 maintains the tape tension required during playback or recording. In the T2 location, the tension pole releases the tension. Subsequently, tension pole 38 is moved to the T3 location for tape unloading.

Figure 8:
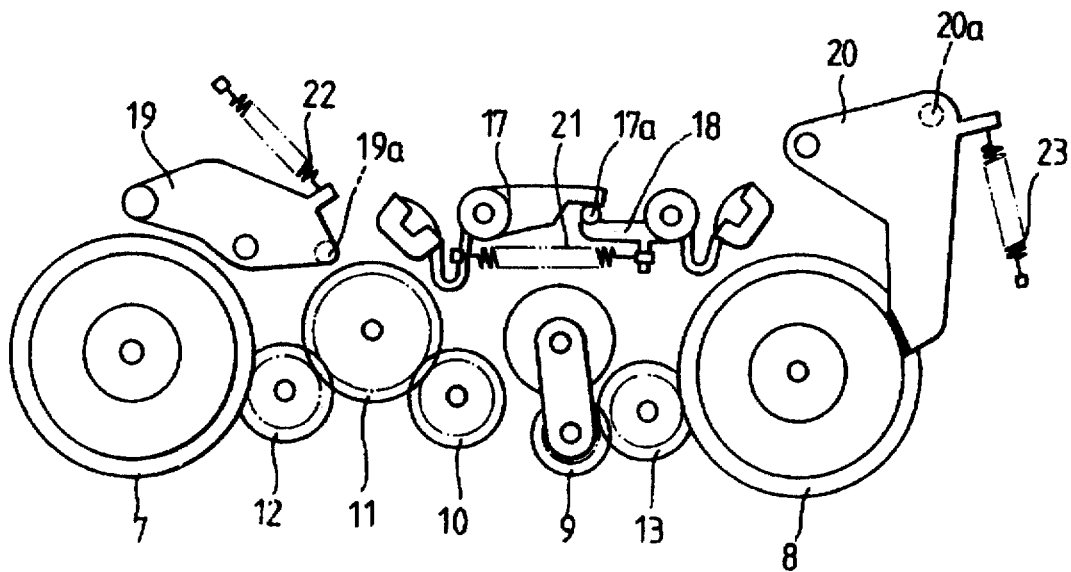
FIG. 8 is a plan view illustrating the operation of the brakes and the driving portion of the reel driving table on which a tape reel is mounted according to the preferred embodiment.

After the completion of the tape loading, when master gear member 54 is rotated to the 233° position, as shown in FIG. 8, as interlocking pin 20a shifts from the lower portion to the upper portion of cam portion 64c of main slide member 61, sub-brake lever 20, engaged with reel driving table 8 on the take-up side, is disengaged therefrom. When the master gear member is rotated further to the 273° position, as interlocking pin 19a shifts from the upper portion to the lower portion of cam portion 64b of main slide member 61, sub-brake lever 19, engaged with reel driving table 7 on the supply side, is disengaged therefrom.

Figure 9A:
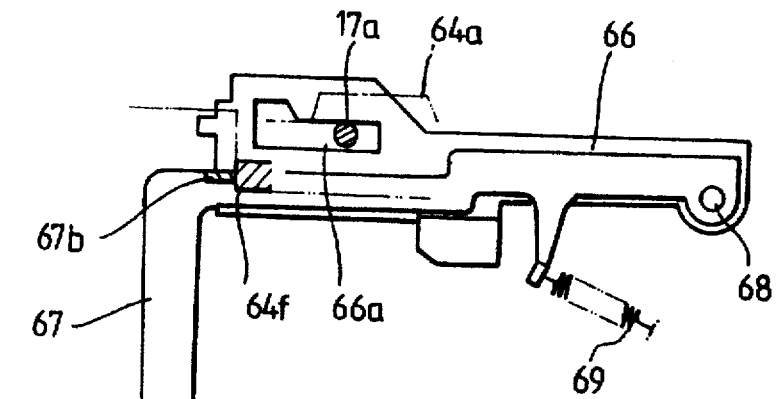
FIG. 9A is a plan view and FIG. 9B is an enlarged view illustrating the instant operation of the main brake for an abrupt stop, when operating in the fast-forward or rewind modes, according to the preferred embodiment.
Figure 9B:
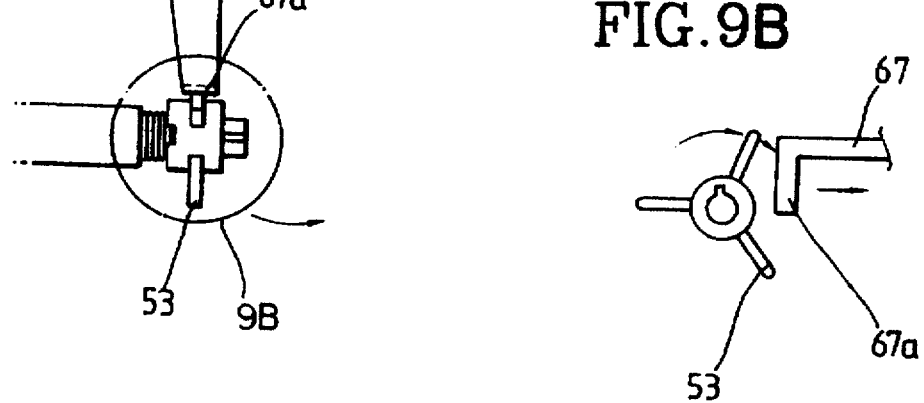

When master gear member 54 is rotated forward (counterclockwise in FIG. 3), main brake levers 17 and 18 of FIG. 8 are disengaged from relay gear 11 and reel driving table 8 throughout the entire rotation period. In this state, if the master gear member is reversely rotated, the main brake levers stop both relay gear 11 and reel driving table 8. Specifically, at first, as interlocking pin 17a of one-sided main brake lever 17 is located in the lower portion of cam portion 64a of main slide member 61, main brake levers 17 and 18 are released. When master gear member 54 is rotated forward to 315°, interlocking pin 17a is located in the upper portion of cam portion 64a. From there to 344°, as shown in FIG. 9, locking lever 66 is moved along with locking release lever 67 having stopping boss 67b which abuts against stopping step 64f of main slide member 61, and the main brake levers are still released by virtue of cam opening 66a of locking lever 66. In this state, when motor 51 is operated in reverse and thus master gear member 54 begins to be reversely rotated, the end 67a of locking release lever 67 is pushed by rotation pin 53 attached to motor 51 and stopping boss 67b moves aside from stopping step 64f, so that locking release lever 67 and locking lever 66 are instantly returned (to the right in FIG. 3) by spring 69. Then, cam opening 66a which obstructs interlocking pin 17a retreats. At this time, as interlocking pin 17a is interlocked with the upper portion of cam portion 64a of main slide member 61, main brake levers 17 and 18 are instantly operated.

Meanwhile, when interlocking pin 65a is located in the upper portion of cam portion 64d of main slide member 61, capstan brake lever 65 is disengaged from capstan 4 (see FIG. 3). When the interlocking pin is in the lower portion of the cam portion, capstan brake lever 65 is pressed against capstan 4. This operation serves to stop capstan 4 within the 253°–273° range of the rotation angle of master gear member 54.

As described above, as the various operational states of the respective portions are changed according to the rotation angle of master gear member 54, deck 1 performs a selected mode such as recording or playback.

Recording/playback mode is performed at 293° of the rotation angle of master gear member 54. Here, tension pole 38 is located in the T1 position, pinch roller 6 is pressed against capstan shaft 5, review pole 49 is moved to the outgoing side of pinch roller 6, and brake levers 17, 18, 19, 20 and 65 all are released.

The forward slow playback is performed at 273° of the rotation angle of master gear member 54. Here, the operational state of capstan brake lever 65 is changed to operate in the state of the recording/playback mode. The reverse slow playback is performed at 253° of the rotation angle of master gear member 54. Here, tension pole 38 retreats slightly to be located in the T2 position in the state of the recording/playback mode (see FIG. 7). Sub-brake lever 20 on the take-up side and capstan brake lever 65 are changed for operation.

The reverse normal playback is performed at 233° of the rotation angle of master gear member 54. Here, the position of tension pole 38 is changed to the T2 position during the recording/playback mode (see FIG. 7).

The fast forward or rewinding of tape is performed at 344° of the rotation angle of master gear member 54. Here, the position of tension pole 38 is changed to the T2 position for the recording/playback mode and pinch roller 6 is completely detached from capstan shaft 5 in the descended position. In this state, in order to select another mode or stop the operation of the deck, a stop button is pressed and as described above, two main brake levers 17 and 18 are instantly operated, in response to rotation of master gear member 54, to promptly stop rotation of reel driving tables 7 and 8 in order to allow the operational mode to be changed.

Such a mode change is carried out when program switch 60 outputs a switching signal according to the rotation angle of master gear member 54 and a microcomputer (not shown), or the like, for performing a program receives the switching signal to control motor 51.

As described above, the magnetic recording and/or reproducing apparatus of the present invention is constructed so that one motor sequentially drives the cassette loading mechanism and the deck, while the master gear member and main slide member interlock the respective portions of the deck. Since the main slide member is moved by a rack and not a spiral cam groove, mode change is performed quickly and the master gear member and main slide member are rarely dislocated, thereby enabling mechanically stable operation. Additionally, since a single main slide member, having several multi-level slide cams, is constructed to simply interlock the respective portions of the deck, the driving of the motor is facilitated and the structure of the apparatus is remarkably simplified. Accordingly, the present invention allows a low-cost, long-life, high-quality magnetic recording and/or reproducing apparatus to be constructed.

While the present invention has been particularly shown and described with reference to a particular embodiment thereof, it will be understood by those skilled in the art that various changes in form and details may be effected therein without departing from the spirit and scope of the invention as defined by the appended claims.

What is claimed is:

1. A magnetic recording and/or reproducing apparatus having a deck which comprises a head drum, a capstan and a pinch roller which are rotated, reel driving means for selectively driving two tape reels on which tape is wound, brake means for selectively stopping the rotation of said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:

a motor;

a master gear member coupled to said motor so as to be rotated by said motor;

a main slide member having a rack formed thereon, said rack being coupled to said master gear member;

interlocking means having a plurality of interlocking portions for interlocking said main slide member with said tape loading means, said brake means, and said reel driving means of said deck; and control means for controlling said motor, and thus said master gear member and said main slide member, in order to change the operational states of respective portions of the deck to assume tape loading, tape reel braking and playback modes all within a single rotation of said master gear member.

2. A magnetic recording and/or reproducing apparatus as claimed in claim 1, further comprising means for allowing said master gear member to move while said main slide member remains stationary during a predetermined period and for driving at least one other gear member during said predetermined period.

3. A magnetic recording and/or reproducing apparatus as claimed in claim 2, wherein said at least one other gear member is coupled to a cassette loading means for loading a cassette for receiving said tape reels.

4. A magnetic recording and/or reproducing apparatus as claimed in claim 2, wherein said at least one other gear member is included in said pinch-roller driving means.

5. A magnetic recording and/or reproducing apparatus as claimed in claim 2, wherein said at least one other gear member is coupled to at least one guide member of said guide means.

6. A magnetic recording and/or reproducing apparatus as claimed in claim 1, wherein a gear portion and a smooth circumference portion are formed through predetermined angles on said master gear member, said master gear member drives said rack of said main slide member when said gear portion is engaged with said rack of said main slide member and said rack of said main slide member slides along said smooth circumference portion when said smooth circumference portion is positioned in opposition to said rack of said main slide member.

7. A magnetic recording and/or reproducing apparatus as claimed in claim 2, wherein a gear portion and a smooth circumference portion are formed through predetermined angles on said master gear member, said master gear member drives said rack of said main slide member when said gear portion is engaged with said rack of said main slide member and said rack of said main slide member slides along said smooth circumference portion when said smooth circumference portion is positioned in opposition to said rack of said main slide member.

8. A magnetic recording and/or reproducing apparatus as claimed in claim 1, wherein said interlocking means comprises an interlocking portion consisting of an engaged pair of loading gears, cam gear teeth being formed on one side of said loading gears, and a loading gear driving portion formed in said main slide member and having gear teeth engaged with the cam gear teeth which are connectedly driven thereby and a slide surface for restraining the rotation of said cam gear teeth, so as to interlock said main slide member and said tape loading means.

9. A magnetic recording and/or reproducing apparatus as claimed in claim 1, wherein said interlocking means comprises an interlocking portion consisting of a tension arm having a tension pole at one end thereof and an interlocking section at a second end thereof, a cam lever having an interlocking pin and one end of which is in elastic contact with said interlocking section and a multilevel cam portion formed in said main slide member, said multilevel cam portion being engaged with said interlocking pin, so as to interlock said main slide member and said tension arm.

10. A magnetic recording and/or reproducing apparatus as claimed in claim 9, wherein said tension pole is selectively moved between a tape pressing position, wherein said tension pole presses against the tape, and a position away from the tape pressing position.

11. A magnetic recording and/or reproducing apparatus as claimed in claim 1, wherein said interlocking means comprises an interlocking portion consisting of an interlocked pair of main brake levers, an interlocking pin formed on one of said main brake levers and a multilevel cam portion formed in said main slide member, said interlocking pin being engaged with said multilevel cam portion so as to interlock said main slide member and said main brake levers.

12. A magnetic recording and/or reproducing apparatus as claimed in claim 11, wherein, said interlocking means comprises a locking lever having a cam opening which is engagable with said interlocking pin so as to selectively disengage said interlocking pin from said multilevel cam portion to quickly operate said pair of main brake levers, a locking release lever coupled to said locking lever by said main slide member, and a rotation pin which is coupled to said motor and abuts against said locking release lever when said motor is rotated in reverse to push said locking release lever to a release position wherein said cam opening is not engaged with said interlocking pin.

13. A magnetic recording and/or reproducing apparatus as claimed in claim 12, wherein at least one of said pair of main brake levers is coupled to a relay gear for driving said one of tape reels to selectively stop said relay gear.

14. A magnetic recording and/or reproducing apparatus as claimed in claim 11, wherein at least one of said pair of main brake levers is coupled to a relay gear for driving one of said tape reels to selectively stop said relay gear.

15. A magnetic recording and/or reproducing apparatus as claimed in claim 1, wherein said interlocking means comprises an interlocking portion consisting of two interlocked sub-brake levers, an interlocking pin formed on each of said sub-brake levers and multilevel cam portions formed in said main slide member, said multilevel cam portions being engaged with a respective one of said interlocking pins, so as to interlock said main slide member and said sub-brake levers.

16. A magnetic recording and/or reproducing apparatus as claimed in claim 1, further comprising a capstan brake lever having an interlocking pin formed thereon and a multilevel cam portion formed in said main slide member, said multilevel cam portion being engaged with said interlocking pin.

17. A magnetic recording and/or reproducing apparatus as claimed in claim 1, further comprising a rotary program switch for generating a switching signal for recognizing mode states according to the rotation angle of said master gear member, coupled to said master gear member.

18. A magnetic recording and/or reproducing apparatus as claimed in claim 1, further comprising an indicator, for indicating the movement distance of said main slide member according to a mode change, formed in said main slide member to indicate a current operational mode of said deck based on a position of said main slide member.

19. A magnetic recording and/or reproducing apparatus having a deck which comprises a head drum, a capstan and a pinch roller which are rotated, reel driving means for selectively driving two tape reels on which tape is wound, brake means for selectively stopping the rotation of said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:
- a motor;
- a master gear member;
- a main slide member having a rack formed thereon, said rack being coupled to said master gear member;
- interlocking means having a plurality of interlocking portions for interlocking said main slide member with said tape loading means, said brake means and said reel driving means of said deck;
- a rotary program switch for generating a switching signal for recognizing mode states according to the unique rotation angle of said master gear member as said master gear member rotates through a single revolution, said rotary program switch being coupled to said master gear member; and
- control means for controlling said motor, and thus said master gear member and said main slide member, in order to change the operational states of respective portions of the deck to assume tape loading, tape reel braking, and playback modes all within a single rotation of said master gear member.

20. A magnetic recording and/or reproducing apparatus having a deck which comprises a head drum, a capstan and a pinch roller which are rotated, reel driving means for selectively driving two tape reels, brake means for selectively stopping the rotation of Said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:
- a motor;
- a master gear member coupled to said motor so as to be rotated by said motor;
- a main slide member having a rack formed thereon, said rack being coupled to said master gear member;
- interlocking means having a plurality of interlocking portions for interlocking said main slide member with at least said tape loading means, said reel driving means, and said brake means;
- scale markings formed on said main slide member, for indicating the movement distance of said main slide member according to a mode change, formed in said main slide member to indicate a current operational mode of said deck based on a position of said main slide member; and
- control means for controlling said motor, and thus said master gear member and said main slide member, in order to change the operational states of respective portions of the deck to assume tape loading, tape reel braking, and playback modes, all within a single rotation of said master gear member.

21. A magnetic recording and/or reproducing apparatus having a deck which comprises a head drum, a capstan and a pinch roller which are rotated, reel driving means for selectively driving two tape reels on which tape is wound, brake means for selectively stopping the rotation of said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:
- a motor;
- a master gear member coupled to said motor so as to be rotated by said motor;
- a main slide member having a rack formed thereon, said rack being coupled to said master gear member;
- interlocking means having a plurality of interlocking portions for interlocking said main slide member with at least said reel driving means, said brake means, end said tape loading means, said interlocking means comprises two interlocked sub-brake levers which are biased into contact with reel driving tables of said tape reels by biasing means, an interlocking pin formed on each of said sub-brake levers and multilevel cam portions formed in said main slide member, said multilevel cam portions being engaged with a respective one of said interlocking pins, so as to interlock said main slide member and said sub-brake levers; and
- control means for controlling said motor, and thus said master gear member and said main slide member, in order to change the operational states of respective portions of the deck to assume tape loading, tape reel braking, and play back modes all within a single rotation of said master gear member.

22. A magnetic recording and/or reproducing apparatus having a deck which comprises a head drum, a capstan and a pinch roller which are rotated, reel driving means for selectively driving two tape reels on which tape is wound, brake means for selectively stopping the rotation of said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:
- a motor;
- a master gear member coupled to said motor so as to be rotated by said motor;
- a main slide member having a rack formed thereon, said rack being coupled to said master gear member;
- interlocking means having a plurality of interlocking portions for interlocking said main slide member with at least said reel driving means, said brake means, and said tape loading means;
- a capstan brake lever having an interlocking pin formed thereon and a multilevel cam portion formed in said main slide member, said multilevel cam portion being engaged with said interlocking pin; and
- control means for controlling said motor, and thus said master gear member and said main slide member, in order to change the operational states of respective portions of the deck to assume tape loading, tape reel braking, and playback modes, all within a single rotation of said master gear member.

23. A magnetic recording and/or reproducing apparatus having a deck which comprises a head drum, a capstan and a pinch roller which are rotated, reel driving means for selectively driving two tape reels on which tape is wound, brake means for selectively stopping the rotation of said two tape reels, tape loading means for loading tape between said two tape reels and onto said head drum, tension maintaining means for maintaining tension in the loaded tape, pinch-roller driving means for pressing the tape between said capstan and said pinch roller, and at least one guide means for guiding traveling tape, said apparatus further comprising:

- a motor;
- a master gear member coupled to said motor so as to be rotated by said motor;
- a main slide member having a rack formed thereon, said rack being coupled to said master gear member;
- interlocking means having a plurality of interlocking portions for interlocking said main slide member with said brake means, said interlocking means further comprises an interlocking portion consisting of an interlocked pair of main brake levers, an interlocking pin formed on one of said main brake levers and a multilevel cam portion formed in said main slide member, said interlocking pin being engaged with said multilevel cam portion so as to interlock said main slide member and said main brake levers, said interlocking means further comprises a locking lever having a cam opening which is engagable with said interlocking pin so as to selectively disengage said interlocking pin from said multilevel cam portion to quickly operate said pair of main brake levers, a locking release lever coupled to said locking lever by said main slide member, and a rotation pin which is coupled to said motor and abuts against said locking release lever when said motor is rotated in reverse to push said locking release lever to a release position wherein said cam opening is not engaged with said interlocking pin; and
- control means for controlling said motor, and thus said master gear member and said main slide member, in order to change the operational states of respective portions of the deck to assume a desired operational mode within a single rotation of said master gear member.

24. A magnetic recording and/or reproducing apparatus as claimed in claim 23, wherein at least one of said pair of main brake levers is coupled to a relay a gear for driving one of said tape reels to selectively stop said relay gear.

\* \* \* \* \*